US008984548B2

(12) United States Patent
Blanchard et al.

(10) Patent No.: US 8,984,548 B2
(45) Date of Patent: Mar. 17, 2015

(54) APPLIED AUTOMATIC DEMOGRAPHIC ANALYSIS

(75) Inventors: Harry E. Blanchard, Rumson, NJ (US);
Hisao Chang, Cedar Park, TX (US);
Michael Johnston, New York, NY (US);
Bernard S. Renger, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 986 days.

(21) Appl. No.: 12/569,008

(22) Filed: Sep. 29, 2009

(65) Prior Publication Data
US 2011/0078720 A1 Mar. 31, 2011

(51) Int. Cl.
*H04H 60/32* (2008.01)
*H04H 60/33* (2008.01)
*H04N 7/10* (2006.01)
*H04N 7/025* (2006.01)
*H04N 7/16* (2011.01)
*H04N 21/2343* (2011.01)
*H04N 21/258* (2011.01)

(52) U.S. Cl.
CPC ......... *H04N 7/165* (2013.01); *H04N 21/23439* (2013.01); *H04N 21/25883* (2013.01)
USPC .................................. 725/18; 725/9; 725/35

(58) Field of Classification Search
None
See application file for complete search history.

(56) References Cited

U.S. PATENT DOCUMENTS

| 5,485,518 | A | 1/1996 | Hunter et al. | |
|---|---|---|---|---|
| 7,774,811 | B2 * | 8/2010 | Poslinski et al. | 725/45 |
| 2002/0072952 | A1 | 6/2002 | Hamzy et al. | |
| 2004/0205334 | A1 * | 10/2004 | Rennels | 713/154 |
| 2005/0149987 | A1 * | 7/2005 | Boccon-Gibod et al. | 725/135 |
| 2005/0177844 | A1 * | 8/2005 | Levi et al. | 725/30 |
| 2005/0240959 | A1 * | 10/2005 | Kuhn et al. | 725/25 |
| 2006/0195875 | A1 * | 8/2006 | LeComte | 725/105 |
| 2007/0271518 | A1 * | 11/2007 | Tischer et al. | 715/744 |
| 2008/0194272 | A1 * | 8/2008 | Smith et al. | 455/456.3 |
| 2010/0232758 | A1 * | 9/2010 | Cook et al. | 386/54 |

* cited by examiner

*Primary Examiner* — Mark D Featherstone
(74) *Attorney, Agent, or Firm* — Greenblum & Bernstein, P.L.C.

(57) ABSTRACT

A method for managing a data stream that is transmitted from a stream transmitter to a stream receiver disposed in an environment that includes at least one individual is provided. The method includes detecting an action of the individual in the environment and determining a demographic descriptor of the individual based on the detected action. The method further includes correlating the determined demographic descriptor and a content of the data stream to determine whether a predetermined condition is satisfied, and, in response to the correlating the demographic descriptor of the individual and the content of the data stream satisfying the predetermined condition, automatically modifying the data stream.

20 Claims, 6 Drawing Sheets

APPLIED AUTOMATIC DEMOGRAPHIC ANALYSIS

BACKGROUND

1. Field of the Disclosure

The present disclosure relates to data stream management. More particularly, the present disclosure relates to automated management of a data stream based on demographic profile information of an individual.

2. Background Information

Data streams, such as radio and television programs, constantly permeate the environments inhabited by individuals. Oftentimes, it is desirable to censor or manage the content of such data streams based upon the individuals that are receiving the data streams. For example, it is typically desirable to censor offensive or inappropriate content in a television program when the television program is being viewed by a minor. Additionally, in a further example, it is often desirable to tailor the content of advertisements in a radio signal or television program to the audience that is receiving the advertisements.

Presently, individuals are able to censor the content of data streams based upon user defined settings. For example, with respect to television programs, an individual is able to block the viewing of a particular program or channel by locking the program or channel that the individual desires to block. Additionally, individuals are able to restrict the viewing of a particular channel or program via parental control settings.

Advertisers and broadcasters are presently able to tailor the content of advertisements to an audience of a particular radio or television program based upon audience measurement studies. For example, Nielsen Media Research monitors television programs viewed by representative individuals and collects user submitted surveys in an effort to determine the size and composition of an audience that views a particular television program. Thereafter, advertisers and broadcasters are able to tailor the content of advertisements to an estimated target audience based on the results of the monitoring and the surveys.

DETAILED DESCRIPTION

Figure 1:
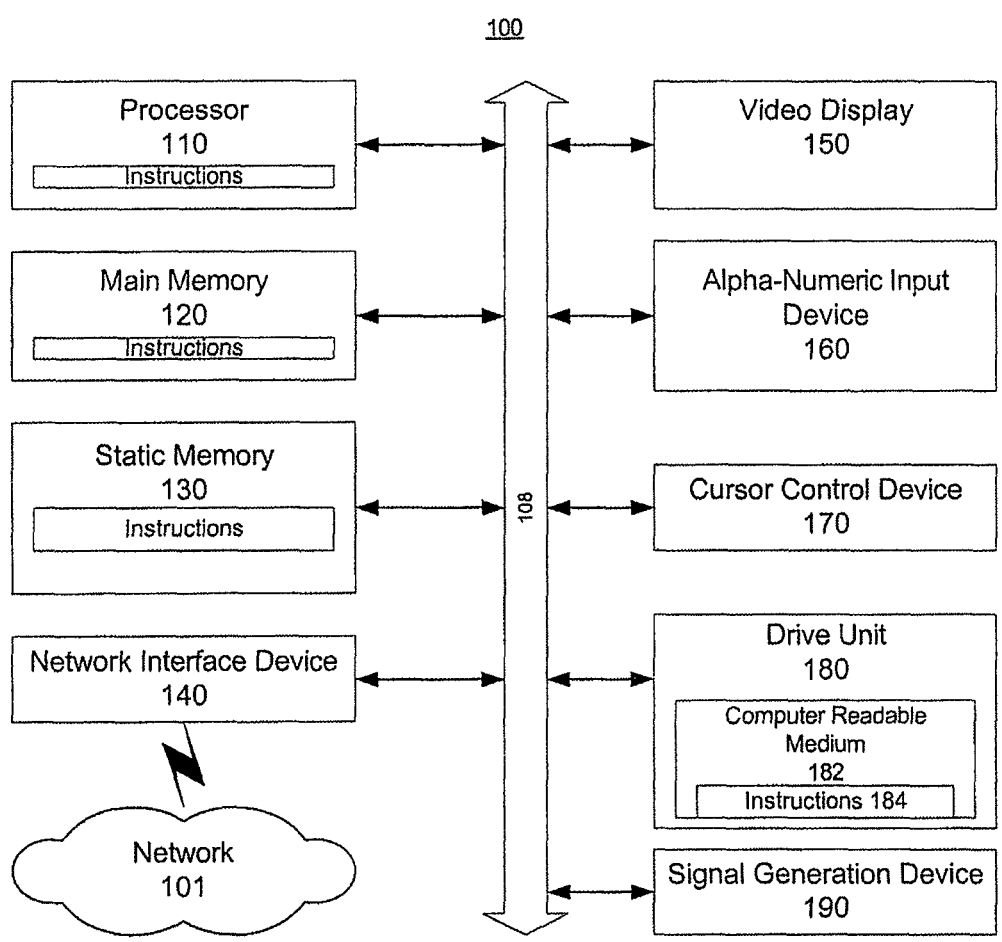
FIG. 1 shows an exemplary general computer system that includes a set of instructions for managing a data stream.

In view of the foregoing, the present disclosure, through one or more of its various aspects, embodiments and/or specific features or sub-components, is thus intended to bring out one or more of the advantages as specifically noted below.

According to an embodiment of the present disclosure, a method for managing a data stream that is transmitted from a stream transmitter to a stream receiver disposed in an environment that includes at least one individual includes: detecting an action of the individual in the environment; determining a demographic descriptor of the individual based on the detected action of the individual; correlating the demographic descriptor of the individual and a content of the data stream to determine whether a predetermined condition is satisfied; and automatically modifying the data stream in response to the correlating the demographic descriptor of the individual and the content of the data stream satisfying the predetermined condition.

According to one aspect of the present disclosure, the action of the individual is an audible output and the demographic descriptor of the individual is determined based on the audible output.

According to another aspect of the present disclosure, known information of the individual is correlated with the audible output of the individual to determine the demographic descriptor of the individual.

According to yet another aspect of the present disclosure, the action of the individual is a user input and the demographic descriptor of the individual is determined based on the user input.

According to still another aspect of the present disclosure, the automatically modifying the data stream includes preventing, with the stream transmitter, the data stream from being transmitted to the stream receiver.

According to an additional aspect of the present disclosure, the stream transmitter transmits a data guide to the stream receiver, and a title of the data stream is removed from the data guide in response to the stream transmitter preventing the data stream from being transmitted to the stream receiver.

According to another aspect of the present disclosure, the automatically modifying the data stream includes interrupting delivery of the data stream to the environment.

According to yet another aspect of the present disclosure, the data stream comprises a plurality of data sub-streams, and the automatically modifying the data stream includes deleting at least one of the plurality of data sub-streams.

According to still another aspect of the present disclosure, the data stream comprises a plurality of data sub-streams, and the automatically modifying the data stream includes censoring at least one of the plurality of data sub-streams.

According to an additional aspect of the present disclosure, the data stream comprises a plurality of data sub-streams, and the automatically modifying the data stream includes replacing at least one of the plurality of data sub-streams with an alternate data sub-stream.

According to another aspect of the present disclosure, the alternate data sub-stream is determined based on the demographic descriptor of the individual.

According to yet another aspect of the present disclosure, the automatically modifying the data stream includes mixing at least one additional data stream with the data stream.

According to still another aspect of the present disclosure, the method includes storing each automatic modification of the data stream in a database.

According to an additional aspect of the present disclosure, the predetermined condition is transmitting the data stream to the individual associated with the demographic descriptor for more than a predetermined period of time, and the automatically modifying the data stream includes interrupting delivery of the data stream to the environment.

According to another aspect of the present disclosure, the environment includes a recorder that records the data stream, the predetermined condition is recording the data stream to the recorder by the individual associated with the demographic descriptor for more than a predetermined amount, and the automatically modifying the data stream includes preventing recording of the data stream to the recorder.

According to yet another aspect of the present disclosure, the environment includes a data conveyor that is configured to convey the data stream to the individual in the environment, and the automatically modifying the data stream includes preventing the data conveyor from conveying the data stream to the individual in the environment.

According to still another aspect of the present disclosure, the environment is a private dwelling of the individual, the data stream is a television stream, and the demographic descriptor is an age of the individual.

According to another embodiment of the present disclosure, a system for managing a data stream that is transmitted from a stream transmitter to a stream receiver disposed in an environment that includes at least one individual includes: a demographic determiner that detects an action of the at least one individual in the environment and determines a demographic descriptor of the at least one individual based on the detected action; a correlator that correlates the demographic descriptor of the at least one individual and a content of the data stream to determine whether a predetermined condition is satisfied; and a stream modifier that automatically modifies the data stream in response to the correlator determining that the predetermined condition is satisfied.

According to one aspect of the present disclosure, the demographic determiner includes an audio detector that detects an audible output of the at least one individual as the action of the at least one individual, and the demographic determiner determines the demographic descriptor based on the audible output detected by the audio detector.

According to another embodiment of the present disclosure, a tangible computer-readable medium encoded with an executable computer program for managing a data stream that is transmitted from a stream transmitter to a stream receiver disposed in an environment that includes at least one individual includes: an action detecting code segment that detects an action of the individual in the environment; a demographic determining code segment that determines, based on the detected action of the individual, a demographic descriptor of the individual; a correlating code segment that correlates the determined demographic descriptor of the individual and a content of the data stream to determine whether a predetermined condition is satisfied; and a modifying code segment that automatically modifies the data stream in response to the correlating code segment determining that, based on correlating the determined demographic descriptor of the individual and the content of the data stream, the predetermined condition is satisfied.

FIG. 1 is an illustrative embodiment of a general computer system, on which a method for managing a data stream can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
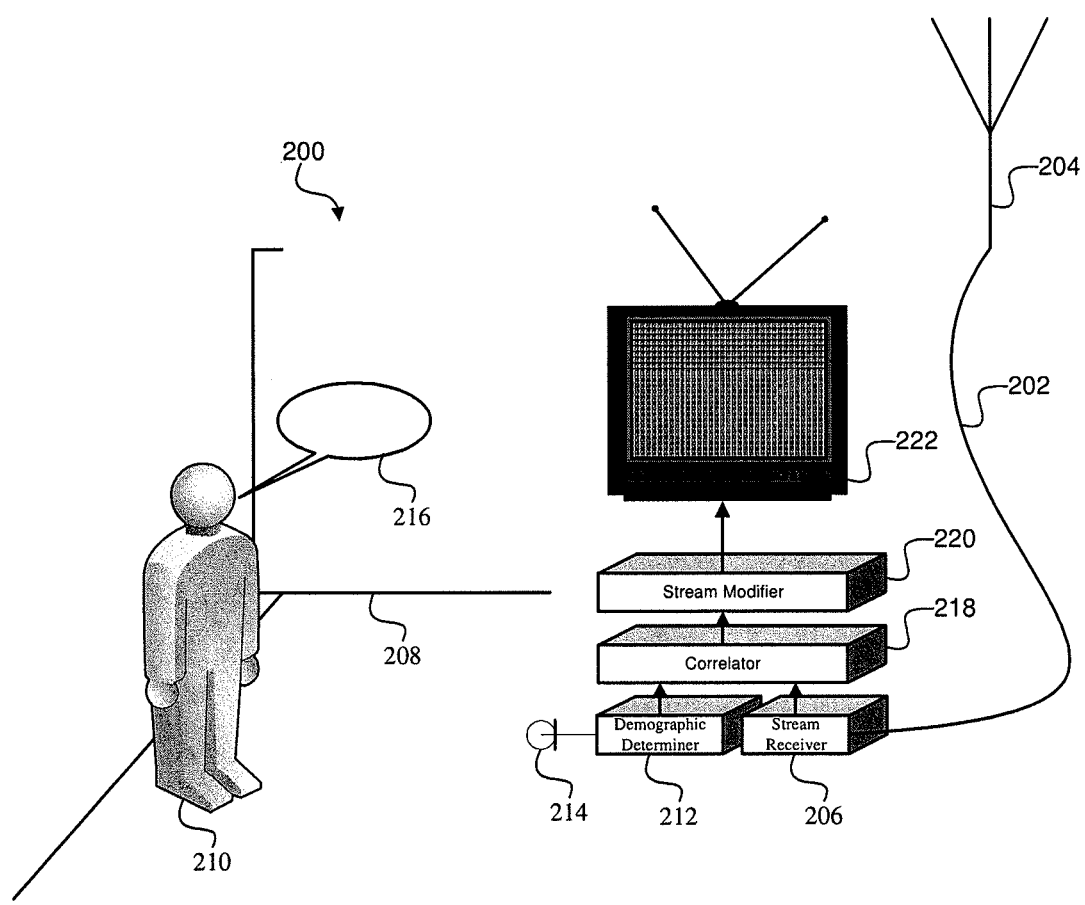
FIG. 2 is a schematic of an embodiment of a system for managing a data stream that is transmitted from a stream transmitter to an environment that includes at least one individual, according to an aspect of the present disclosure.

A system 200 for managing a data stream 202 that is transmitted from a stream transmitter 204 to a stream receiver 206 disposed in an environment 208 that includes at least one individual 210 is generally shown in FIG. 2.

In the exemplary embodiment of the system 200 shown in FIG. 2, the data stream 202 is shown as a video stream. However, those skilled in the art appreciate that, in additional embodiments of the present application, the data stream 202 may be an audio stream or any other type of data stream. Additionally, those skilled in the art further appreciate that the data stream 202 may be an analog data stream or a digital data stream.

In the exemplary system 200 shown in FIG. 2, the stream transmitter 204 is shown as being an antenna and the stream receiver 206 is shown as being a set-top box. However, those skilled in the art appreciate that the data steam 202 may be transmitted from additional types of stream transmitters 204. Additionally, the stream receiver 206 that is disposed in the environment 208 and that receives the data stream 202 from the stream transmitter 204 may be an alternative type of stream receiver, such as, but not limited to, a television receiver, a radio receiver, or any other type of receiver commonly known in the art.

In the exemplary system 200, the environment 208 is shown as a private dwelling. However, those skilled in the art appreciate that the environment 208 may be additional types of environments, such as, but not limited to, a public environment or a commercial establishment. Furthermore, the individual 210 in the environment 208 may be either a known individual or an unknown individual. For example, the individual 210 may be a known family member that resides at a private dwelling or the individual may be an unknown patron that visits a commercial establishment. Of course, those skilled in the art appreciate that the embodiments as described above are to be considered merely exemplary and are not intended to be limiting.

The system 200 includes a demographic determiner 212 that detects an action 216 of the individual 210 in the environment 208 and that determines a demographic descriptor of the individual 210 based on the detected action 216. In FIG. 2, the demographic determiner 212 is shown as including an audio capture device 214 for detecting a voice activity or an audible output of the individual. However, in additional embodiments of the system 200, the demographic determiner 212 may include an input receiver for receiving an input of the individual 210 or any other detector for detecting any type of action of the individual. The action 216 is shown in FIG. 2 as being an activity of a single individual 210, however, in alternative embodiments of the system, the detected action 216 may be an activity of a plurality of individuals 210. For example, in an alternative embodiment of the system 200, the demographic determiner 212 may detect voice activities of a plurality of individuals.

In the embodiment of the system 200 wherein the demographic determiner 212 detects action 216 of a plurality of individuals 210, the demographic determiner 212 may determine a demographic descriptor of the plurality of individuals 210 based on the totality of the detected action 216, or, alternatively, the demographic determiner 212 may filter the detected action 216 to determine the demographic descriptor. For example, the demographic determiner 212 may filter the detected action 216 based upon volume, pitch, frequency, tone, or any other characteristic of the action 216.

In the embodiment of the system 200 wherein the demographic determiner 212 detects action 216 of a plurality of individuals 210, the demographic determiner 212 may determine a demographic descriptor for each of the plurality of individuals 210. For example, if the demographic determiner 212 detects an action 216 that is a conversation occurring among a plurality of individuals 210, the demographic determiner 212 may filter the conversation based upon a characteristic, such as volume, pitch, frequency, or tone, to determine a demographic descriptor for each individual 210 participating in the conversation. Of course, those skilled in the art will appreciate that the embodiment as described above is to be considered merely exemplary and is not intended to be limiting.

The demographic determiner 212 may analyze the detected action 216 based upon any characteristic of the action 216 to determine the demographic descriptor. For example, in the embodiment of the system 200 wherein the detected action 216 is voice activity, the voice activity may be analyzed according to, but not limited to, any linguistic property of the voice activity or any paralinguistic property of the voice activity. Additionally, or alternatively, the voice activity may be analyzed according to any combination of linguistic and/or paralinguistic properties in order to determine the demographic descriptor.

The demographic descriptor determined by the demographic determiner 212 may be any descriptor which identifies a characteristic of the individual 210. For example, the demographic descriptor may be, but is not limited to, age, race, nationality, gender, educational attainment, and location. Of course, those skilled in the art will appreciate that additional demographic descriptors may be used in addition to, or alternatively to, the exemplary demographic descriptors listed above.

The system 200 includes a correlator 218 that correlates the determined demographic descriptor of the individual 210 and a content of the data stream 202 to determine whether a particular condition is satisfied. For example, in an exemplary embodiment of the system 200, wherein the demographic descriptor is an age of the individual 210, the correlator 218 may determine whether the age of the individual 210 is less than a recommended viewing age of the data stream 202. That is, if a data stream 202 includes a Motion Picture Association of America rating of "R" or "Restricted," the correlator 218 may determine whether the age of the individual 210 is less than the age of 17. In a further exemplary embodiment of the system 200, the correlator 218 may determine whether the demographic descriptor of the individual 210 corresponds, or does not correspond, to a genre of the data stream 202. That is, if the genre of the data stream 202 relates to a sporting event or sports, the correlator 218 may determine whether the demographic descriptor of the individual 210 is a male, or alternatively, that the demographic descriptor is not a male. Of course, those skilled in the art will appreciate that the embodiments described above are to be considered merely exemplary and are not intended to be limiting.

As shown in FIG. 2, the system 200 further includes a stream modifier 220 that automatically modifies the data stream in response to the correlator 218 determining that the predetermined condition is satisfied. For example, in the exemplary embodiment described above wherein the correlator 218 determines that the age of the individual 210 is less than a recommended viewing age of the data stream 202, the stream modifier 220 automatically modifies the data stream 202. According to such an exemplary embodiment, the stream modifier 220 may censor or edit the data steam 202 to remove any offensive or inappropriate content. Of course, those skilled in the art will appreciate that the embodiment described above is to be considered merely exemplary and is not intended to be limiting and that the stream modifier 220 may automatically modify the data stream 202 in additional and/or alternative methods. For example, in the exemplary embodiment described above wherein the correlator 218 determines that the genre of the data stream 202 relates to men's clothing and that the gender of the individual 210 is not a male, then the stream modifier 220 may automatically modify the data stream 202 by replacing the data stream 202 with a data stream 202 relating to women's clothing.

After automatically modifying the data stream 202, as shown in FIG. 2, the stream modifier 220 may output the modified data stream 202 to a data conveyor 222, such as a television, for conveying the modified data stream 202 to the individual 210 in the environment 208. Of course, those skilled in the art appreciate that in additional embodiments, additional and/or alternative data conveyors 222 may also be used, such as, but not limited to, computers, projectors, radios, electronic billboards, etc.

Figure 3:
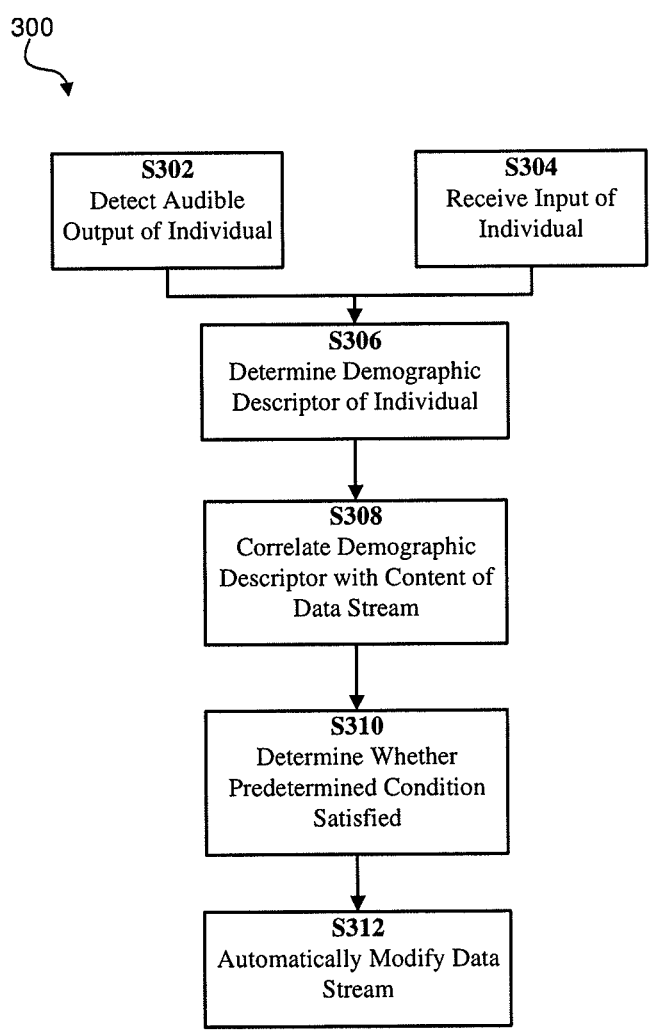
FIG. 3 is a flowchart of an embodiment of a method for managing a data stream that is transmitted from a stream transmitter to a stream receiver disposed in an environment that includes at least one individual, according to an aspect of the present disclosure.

The present disclosure also provides a method for managing a data stream that is transmitted to a stream receiver that is disposed in an environment that includes at least one individual. An exemplary method 300 is generally shown in FIG. 3. The method includes detecting an action of the individual in the environment S302, S304. As shown in FIG. 3, the method 300 may include detecting an audible output of the individual as the action of the individual S302, or receiving an input of the individual as the action of the individual S304. Those skilled in the art appreciate that additional, and or alternative, actions of the individual may also be detected in additional embodiments of the method 300.

In the method 300 as shown in FIG. 3, a demographic descriptor of the individual is determined based on the detected action of the individual S306. As previously discussed, the demographic descriptor of the individual may be any descriptor which identifies a characteristic of the individual, such as, but not limited to, age, race, nationality, gender, educational attainment, and location.

According to the method 300, the determined demographic descriptor of the individual is correlated with a content of the data stream that is transmitted to the stream receiver S308, and it is determined whether a predetermined condition is satisfied S310. As previously discussed, according to the method 300, it may be determined whether the predetermined condition is satisfied based upon an age of the individual and a Motion Picture Association of America rating of the content of the stream, based upon a gender of the individual and a genre of the content of the data stream, or based upon a nationality or location of the individual and a language of the content of the data stream. Of course, those skilled in the art will appreciate that the embodiments listed above are to be considered merely exemplary and are not intended to be limiting.

In the method 300, if it is determined that the predetermined condition is satisfied, the data stream is automatically modified S312.

Figure 4:
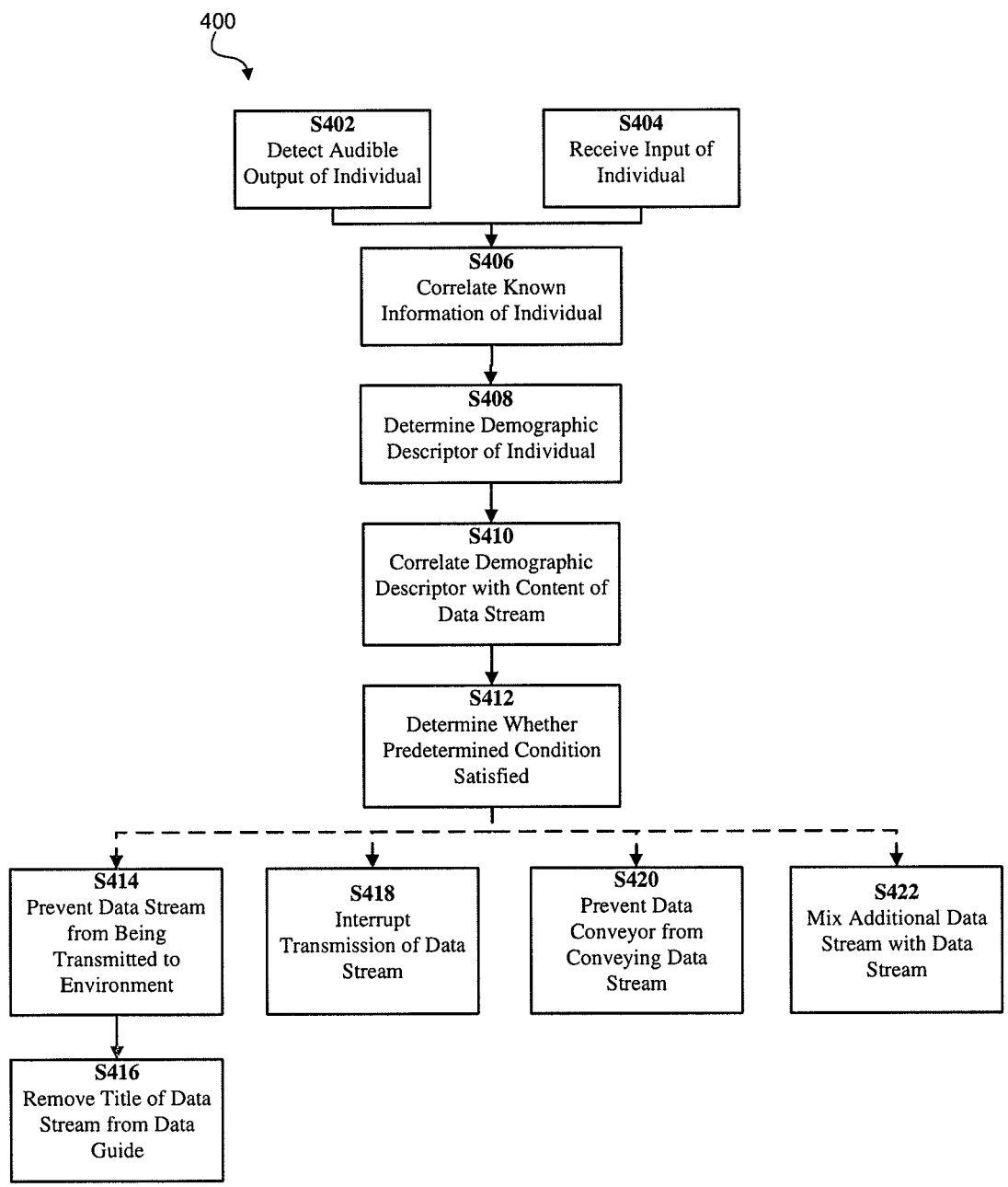
FIG. 4 is a flowchart of a further embodiment of a method for managing a data stream that is transmitted from a stream transmitter to a stream receiver disposed in an environment that includes at least one individual, according to an aspect of the present disclosure.

In an alternative method 400 as shown in FIG. 4, at least one of an audible output of an individual is detected S402 and an input of the individual is received S404 as the action of the individual. According to the method 400, known information of the individual is correlated with the detected action of the individual S406. For example, if the environment is a household that is known to contain a certain number of residents, the detected action of the individual may be correlated with the information that is known of the residents of the household to determine which of the residents the individual is. Additionally, or alternatively, the detected action of the individual may be correlated with the information that is known of the residents to determine the age, or any other demographic descriptor, of the individual. Of course, those skilled in the art will appreciate that the examples listed above are to be considered merely exemplary and are not intended to be limiting.

In the method 400 shown in FIG. 4, a demographic descriptor of the individual is determined based on the action of the individual and the known information of the individual S408, the demographic descriptor is correlated with a content of the data stream S410, it is determined whether the correlating the demographic descriptor of the individual and the content of the data stream satisfies a predetermined condition S412, and, in response to the predetermined condition being satisfied, the data stream is automatically modified S414, S418, S420, S422. In the method 400, the data stream may be automatically modified by a stream transmitter, a stream receiver, a stream modifier, or any other device.

As shown in FIG. 4, the data stream may be automatically modified by preventing the data stream from being transmitted to the environment S414. For example, in an exemplary and non-limiting embodiment of the method 400, if an individual is watching television in the environment and it is determined that the individual is a minor, then the method 400 may determine any upcoming programs which may be inappropriate for the individual and may prevent such programs from being transmitted to the environment. In this regard, the method 400 may further remove a title of a data stream that is prevented from being transmitted to the environment from a data guide S416. For example, in the exemplary embodiment described above, a title of any television program that is prevented from being transmitted to the environment is removed from a data guide of the television programs so that the individual is unaware that such a program exists. According to the method 400, the stream transmitter may prevent transmission of the data stream to the environment, or, alternatively, a stream receiver may deny reception of the data stream at the environment.

In an alternative embodiment of the method 400 as shown FIG. 4, the data stream may be automatically modified by interrupting transmission of the data stream S418. For example, in a non-limiting and exemplary embodiment, if an individual is perceiving the content of the data stream, and it is subsequently determined that the content of the data stream is inappropriate for the individual and/or unwanted or offensive to the individual, then transmission of the data stream to the environment is interrupted. In other words, a data stream that was previously being transmitted to the environment is no longer transmitted, or is stopped from being transmitted, to the environment. At least one of a stream transmitter, stream receiver, or stream modifier may interrupt the transmission of the data stream to the environment.

In a further alternative embodiment of the method 400 as shown FIG. 4, the data stream may be automatically modified by preventing a data conveyor from conveying the data stream to the environment S420. For example, in a non-limiting and exemplary embodiment of the method 400 wherein a television conveys the data stream to the environment, if it is determined that the predetermined condition is satisfied at S412, then the television prevents the data stream from being conveyed to the environment. In this regard, the data stream may include a flag or other indicator that notifies the television to prevent transmission of the data stream to the environment. Of course, those skilled in the art will appreciate that the example listed above is to be considered merely exemplary and is not intended to be limiting.

In an even further embodiment of the method 400 as shown FIG. 4, the data stream may be automatically modified by mixing an additional data stream with the data stream that is being transmitted to the environment S422. For example, in an exemplary and non-limiting embodiment of the present application in which the individual is watching television in the environment, if it is determined that the individual is a middle-aged male and it is further known that either the individual enjoys watching a particular program or that most middle-age males enjoy watching a particular program, then an advertisement for the particular program may be displayed along with the current program that the individual is watching. Of course, those skilled in the art will appreciate that the example listed above is to be considered merely exemplary and is not intended to be limiting. For example, those skilled in the art realize that additional data streams, such as, but not limited to, advertisements, current events, news, and/or sports scores may also be added to the data stream that is transmitted to the environment.

Figure 5:
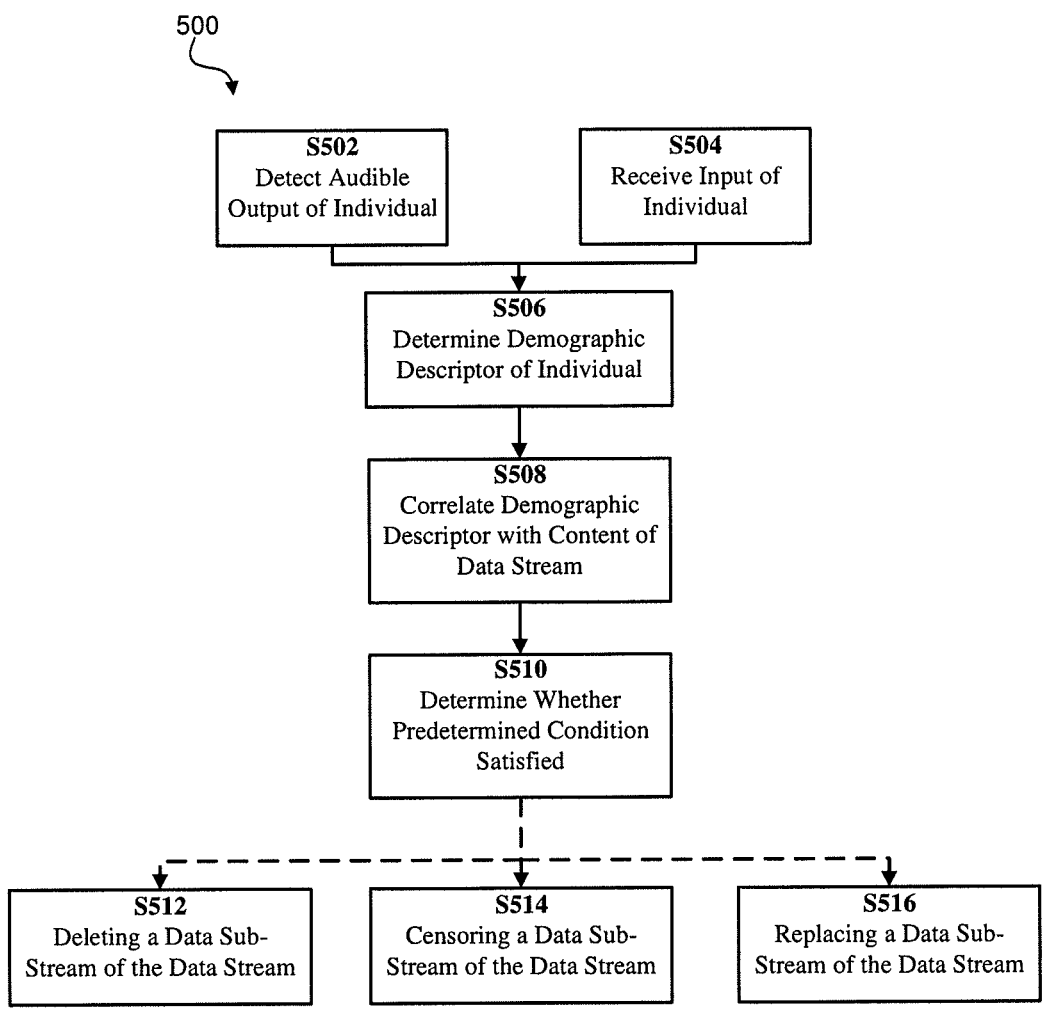
FIG. 5 is a flowchart of an additional embodiment of a method for managing a data stream that is transmitted from a stream transmitter to a stream receiver disposed in an environment that includes at least one individual, according to an aspect of the present disclosure.

In an alternative method 500 as shown in FIG. 5, an action of at least one individual is detected in the environment S502, S504, a demographic descriptor of the individual is determined based on the action of the at least one individual S506, the determined demographic descriptor is correlated with a content of a data stream being transmitted to the environment S508, and it is determined whether a predetermined condition is satisfied S510. In response to determining that the predetermined condition is satisfied, the method 500 automatically modifies the data stream S512, S514, S516.

According to the method 500, if the data stream comprises a plurality of data sub-streams, then the data stream may be automatically modified by deleting at least one of the plurality of data sub-streams of the data stream S512. For example, in an exemplary and non-limiting embodiment of the method 500 in which the individual is watching a television program, if it is determined that the individual is a minor and that the data stream includes data sub-streams which include content that is inappropriate or which may be offensive to minors, then such data sub-streams are deleted from the data stream. In other words, the data stream is edited to remove any inappropriate or offensive content. Of course, those skilled in the art will appreciate that the example listed above is to be considered merely exemplary and is not intended to be limiting.

In an alternative embodiment of the method 500 as shown FIG. 5, if the data stream comprises a plurality of data sub-streams, then the data stream may be automatically modified by censoring at least one of the plurality of data sub-streams of the data stream. For example, in an exemplary and non-limiting embodiment of the method 500 in which the individual is watching a television program, if it is determined that the individual is a minor and that the data stream includes data sub-streams which include content that is inappropriate or which may be offensive to minors, then such data sub-streams may be censored to block any inappropriate or offensive content. For example, any offensive language maybe "bleeped" out while any inappropriate images may be covered with a black box or scrambled. Of course, those skilled in the art will appreciate that the example listed above is to be considered merely exemplary and is not intended to be limiting.

In a further alternative embodiment of the method 500 as shown FIG. 5, if the data stream comprises a plurality of data sub-streams, the data stream may be automatically modified by replacing at least one of the plurality of data sub-streams of the data stream with an alternate data sub-stream. For example, in an exemplary and non-limiting embodiment of the method 500 in which the individual is watching a television program, if it is determined that the individual is a minor and that the data stream includes data sub-streams which include content that is inappropriate or which may be offensive to minors, such data streams may be replaced with alternate, edited data sub-streams. For example, data sub-streams that include offensive language may be replaced with data sub-streams that include a voice-over. Of course, those skilled in the art will appreciate that the example listed above is to be considered merely exemplary and is not intended to be limiting.

In the embodiment of the method 500 in which at least one of the plurality of data sub-streams is replaced with an alternate data sub-stream, the alternate data-sub-stream may be based on the demographic descriptor of the individual. For example, in an embodiment of the method 500 in which the individual is watching a television program containing commercials, if it is determined that the individual is located in the Midwest, then a commercial including an advertisement for the Washington Redskins may be replaced with a commercial including an advertisement for the Chicago Bears. Of course, those skilled in the art will appreciate that the example listed above is to be considered merely exemplary and is not intended to be limiting.

Figure 6:
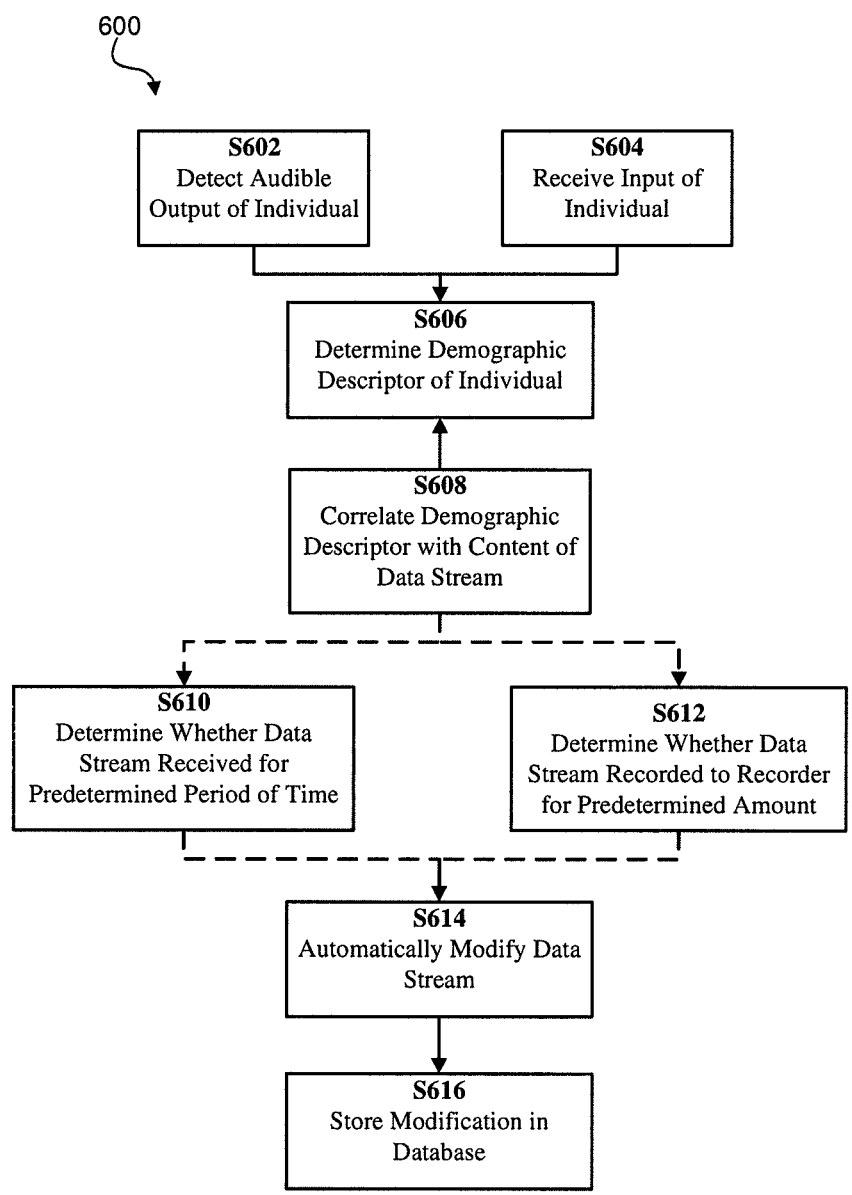
FIG. 6 is a flowchart of still another embodiment of a method for managing a data stream that is transmitted from a stream transmitter to a stream receiver disposed in an environment that includes at least one individual, according to an aspect of the present disclosure.

In an alternative method 600 as shown in FIG. 6, an action of at least one individual is detected in the environment S602, S604, a demographic descriptor of the individual is determined based on the action of the at least one individual S606, the determined demographic descriptor is correlated with a content of a data stream being transmitted to the environment S608, and it is determined whether a predetermined condition is satisfied S610, S612.

In the method 600, in determining whether the predetermined condition is satisfied, it may be determined whether an individual identified or associated with the demographic descriptor has received the data stream for a predetermined period of time during a predetermined period. For example, in an exemplary and non-limiting embodiment of the method 600 in which the individual is watching a television program, if it is determined that the individual is a ten year old boy, then the method 600 may determine whether the ten year old boy has been watching television programs for more than a predetermined period of time, such as, for more than six hours during a twenty-four hour period. If the method 600 determines that the ten year old boy has been watching television programs for more than the predetermined period of time, then the method may automatically modify the data stream S614. For example, the method S614 may prevent the ten year old boy from watching any further television programs. Of course, those skilled in the art will appreciate that the example listed above is to be considered merely exemplary and is not intended to be limiting.

In an alternative embodiment of the method 600, in determining whether the predetermined condition is satisfied, it may be determined whether an individual associated with the demographic descriptor has recorded the data stream to a data stream recorder for more than a predetermined period of time. For example, it may be determined whether the individual associated with a determined demographic descriptor has recorded the data stream to the data stream recorder for more than twenty percent of the capacity of the data stream recorder. According to such an embodiment, the disk space of a data stream recorder can be allocated amongst the residents of a family. Of course, those skilled in the art will appreciate that the example listed above is to be considered merely exemplary and is not intended to be limiting.

As shown in FIG. 6, the method may further include a database that stores the automatic data modifications made by the method S616. According to such a feature, the method may determine individual preferences and frequent modifications for adjusting preferences of the individual and for predicting future modifications.

The present disclosure also provides a tangible computer-readable medium encoded with an executable computer program for managing a data stream that is transmitted from a stream transmitter to a stream receiver, wherein the stream receiver is disposed in an environment that includes at least one individual. The computer-readable medium includes an action detecting code segment that detects an action of the individual in the environment and a demographic determining code segment that determines, based on the detected action of the individual, a demographic descriptor of the individual. A correlating code segment correlates the determined demographic descriptor of the individual and a content of the data stream to determine whether a predetermined condition is satisfied. In response to the correlating code segment determining that the predetermined condition is satisfied, a modifying code segment automatically modifies the data stream.

Accordingly, the present invention enables management of a data stream that is transmitted to an environment that includes at least one individual based on a determined demographic descriptor of the individual. The demographic descriptor of the individual is determined based upon an action of the individual rather than being based upon user defined settings. Accordingly, the present invention provides real-time identification of a demographic descriptor of an individual and provides for automatically modifying the data stream based on the identified demographic descriptor.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the demographic determiner is described herein as including an audio capture device for capturing an audible output of the individual. However, those skilled in the art appreciate that the demographic determiner may include additional, or alternative, means for detecting any type of action of the individual, such as, but not limited to, a video capture device for detecting a visual action of the individual. Furthermore, while the present invention has generally been described with reference to the non-limiting and exemplary embodiment of detecting an age of an individual and automatically modifying a data stream comprising a television program based upon the age of the individual, those skilled in the art appreciate that the present invention may also comprise additional embodiments. For example, the present invention may determine a geographic location of an individual or individuals and automatically modify the data stream based upon the location of the individual to provide geographically sensitive data to the individual. Additionally, or alternatively, in further embodiments, the present invention may tailor advertisements or programs to individuals based upon various demographic descriptors. Of course, those skilled in the art will appreciate that the example listed above is to be considered merely exemplary and is not intended to be limiting.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing a data stream that is transmitted to an environment, the method comprising:
    displaying the data stream in the environment, the data stream including a current program;
    detecting an action of an individual in the environment, the action being an audible output;
    determining a demographic descriptor of the individual with a processor and based on the audible output, the demographic descriptor comprising a geographic descriptor of the individual;
    correlating the demographic descriptor of the individual and a content of the data stream with the processor to determine whether a predetermined condition is satisfied; and
    modifying the data stream to display the current program along with additional data for a different program, the additional data determined based on the demographic descriptor of the individual and displayed in response to the correlating the demographic descriptor of the individual and the content of the data stream satisfying the predetermined condition.

2. The method as set forth in claim 1, wherein known information of the individual is correlated with the audible output of the individual to determine the demographic descriptor of the individual.

3. The method as set forth in claim 1, wherein the action of the individual includes a user input and the demographic descriptor of the individual is determined based on the user input.

4. The method as set forth in claim 1, wherein the modifying the data stream includes displaying an advertisement for the different program.

5. The method as set forth in claim 1, wherein the modifying the data stream includes displaying a score of the different program.

6. The method as set forth in claim 1, wherein the data stream comprises a plurality of data sub-streams, and the modifying the data stream includes deleting one of the plurality of data sub-streams.

7. The method as set forth in claim 1, wherein the data stream comprises a plurality of data sub-streams, and the modifying the data stream includes censoring one of the plurality of data sub-streams.

8. The method as set forth in claim 1, wherein the data stream comprises a plurality of data sub-streams, and the modifying the data stream includes replacing one of the plurality of data sub-streams with an alternate data sub-stream.

9. The method as set forth in claim 1, wherein the additional data is determined based on the geographic descriptor of the individual.

10. The method as set forth in claim 1, wherein the modifying the data stream includes mixing an additional data stream with the data stream.

11. The method as set forth in claim 1, further comprising: storing each modification of the data stream in a database.

12. The method as set forth in claim 1, wherein the environment is a private dwelling of the individual, the data stream is a television stream, and the demographic descriptor further comprises an age of the individual.

13. The method as set forth in claim 1, wherein the demographic descriptor, including the geographic descriptor of the individual, is determined based on the action of the individual and known information of the individual.

14. The method as set forth in claim 1, wherein the predetermined condition includes correlating a content of the data stream and the geographic descriptor of the individual.

15. A system for managing a data stream that is transmitted to an environment, the system comprising:
    a display that displays the data stream in the environment, the data stream including current program;
    a demographic determining processor that detects an action of an individual in the environment, the action being an audible output, and determines a demographic descriptor of the individual based on the audible output, the demographic descriptor comprising a geographic descriptor of the individual;
    a correlating processor that correlates the demographic descriptor of the individual and a content of the data stream to determine whether a predetermined condition is satisfied; and
    a stream modification processor that modifies the data stream to display the current program along with additional data for a different program, the additional data determined based on the demographic descriptor of the individual and displayed in response to the correlating processor determining that the predetermined condition is satisfied.

16. The system as set forth in claim 15, wherein the demographic determining processor includes an audio detector that detects the audible output.

17. The system as set forth in claim 15, wherein the demographic descriptor, including the geographic descriptor of the individual, is determined based on the action of the individual and known information of the individual.

18. The system as set forth in claim 15, wherein the predetermined condition includes correlating a content of the data stream and the geographic descriptor of the individual.

19. The system as set forth in claim 15, wherein the modifying the data stream includes displaying an advertisement for the different program.

20. A tangible computer-readable medium encoded with an executable computer program for managing a data stream that is transmitted to an environment that, when executed by a processor, causes the processor to perform operations comprising:
- displaying the data stream in the environment, the data stream including a current program;
- detecting an action of an individual in the environment, the action being an audible output;
- determining, based on the audible output, a demographic descriptor of the individual, the demographic descriptor comprising a geographic descriptor of the individual;
- correlating the demographic descriptor of the individual and a content of the data stream to determine whether a predetermined condition is satisfied; and
- modifying the data stream to display the current program along with additional data for a different program, the additional data determined based on the demographic descriptor of the individual and displayed in response to the correlating determining that the predetermined condition is satisfied.

* * * * *